(12) United States Patent
Kohl

(10) Patent No.: US 6,539,493 B1
(45) Date of Patent: Mar. 25, 2003

(54) METHOD OF UPDATING THE SYSTEM TIME OF A DATA PROCESSOR SYSTEM

(75) Inventor: Volker Kohl, Berlin (DE)

(73) Assignee: UbiCom GmbH, Hohen Neuendorf (DE)

( * ) Notice: Subject to any disclaimer, the term of this patent is extended or adjusted under 35 U.S.C. 154(b) by 0 days.

(21) Appl. No.: 09/455,775

(22) Filed: Dec. 7, 1999

(30) Foreign Application Priority Data

Dec. 8, 1998 (DE) .......................................... 198 58 936
Dec. 31, 1998 (DE) .......................................... 198 60 936

(51) Int. Cl.⁷ ................................................. G06F 1/04
(52) U.S. Cl. ..................................................... 713/600
(58) Field of Search ................................ 713/500, 502, 713/503, 600, 400

(56) References Cited

U.S. PATENT DOCUMENTS 4,490,821 A * 12/1984 Lacher ....................... 714/700
6,105,145 A * 8/2000 Morgan et al. ............. 713/501
6,138,243 A * 10/2000 Mealey et al. .............. 713/400

FOREIGN PATENT DOCUMENTS

EP          0691598 A2   10/1995

* cited by examiner

Primary Examiner—Thomas M. Heckler
(74) Attorney, Agent, or Firm—Venable; Robert Kinberg

(57) ABSTRACT

A method of updating the system time of a data processor system that stores the actual system time which is linked to a subscriber station and a communication service of a communications network. The subscriber station of the data processor system communicates a message that contains the subscriber station's own address as the destination address. Upon receipt of this message, the time-related information of the message is parsed and transferred into a memory of the data processor system.

19 Claims, 3 Drawing Sheets

METHOD OF UPDATING THE SYSTEM TIME OF A DATA PROCESSOR SYSTEM

FIELD OF THE INVENTION

The present invention relates to a method of updating the system time of the timer of a data processor system. More specifically, the present invention involves using the time information of a message to update the system time of a data processor.

BACKGROUND OF THE INVENTION

The exact operation of a data processor system requires a precise time base. It is common to provide a clock component with a high-precision quartz oscillator generating the system clock cycle in a data processor system for forming a time base which the operator of the data processor system can "set" either once or as necessary in the case of deviations of time with respect to an official time, using a different time base.

European Patent EP 0 691 598 A2 discloses a method of and an apparatus for updating the time of a system clock in a consumer electronics unit. According to the method, transmitted real time information is used for setting the clock, which can be extracted from high-frequency radio signal, in that case from the video text signal.

The disadvantage of this system resides in the fact that many radio services do not contain such a time information.

In overcoming the deficiencies of prior art, the present invention proposes a method that may be employed in a data processor system to update the time base of the data processor system, while security in terms of manipulation or tampering and freedom of maintenance are ensured, whenever a time information is not regularly transmitted in the radio service. The present invention also proposes an apparatus for carrying out the method.

SUMMARY OF THE INVENTION

A reduction of the hardware for the generation of data required for the operation of a data processor system can be achieved when such data is extracted from another electronic means where it is available already only under defined conditions in the course of operation, and can be made available in the original data processor system, too, whenever this will be necessary.

In the case of an SMS message to be communicated between two subscribers via the SMA service (Short Message Service)—which constitutes one element in the service programme—in compliance with the international GSM Standard (Global System for Mobile Communication), data is available due to a digital timing marker including the respective actual date and time information, by means of which this message is supplemented in the locally active base station of the GSM radio network by the time of transmission, which data may be expediently used also for another system—independently of the contents of the SMS message communicated. The time information is advantageously highly precise because the GSM providers use clocks with a high precision level, preferably in view of rate accounting.

In accordance with the present invention the timing marker containing the date and time information of a previously transmitted SMS message, which is received via the GSM radio network, is internally selected as digital signal component in the system of the subscriber station and used as a time base of a data processor system. For the transmission of the signal component forming the time marker from the subscriber station to the data processor system a separate data communication line is used.

According to the present invention, the subscriber station connected to the data processor system sends an SMS message to itself for updating the timer of the data processor system. In this concept the fact is expediently made use of, on the one hand, that in a radio network—in distinction from a line-switching system—the time interval within which reception is possible again already after transmission of a message is shorter than the time which such a message takes for being emitted by the radio service again after reception because mostly the message is additionally buffered in the associated message server.

Moreover, the method according to the present invention presents the advantage that the length and the contents of the message are not awarded any importance for enabling the timing marker to be imprinted on the message in the subscriber station. In accordance with an exemplary embodiment of the present invention, an individual identifier is used as contents of the SMS message which allows for a recognition of the emitted message.

In accordance with the method of the present invention, upon receipt of the SMS message, the subscriber station performs a system-internal selection of the digital signal component carrying the date and time information in the SMS message, and this timing marker is used for updating the system time of the timer upon communication to the data processor system.

When one and the same subscriber station is sender and the receiver of an SMS message, the method makes it possible in a simple manner to obtain this date and time information for the data processor system as required by sending an SMS message.

When the subscriber station receives the call from a third party during the transit time of an SMS message sent by itself the SMS message will not be lost because the network operator buffers the SMS message and forwards it together with the time information then actual to the subscriber station after the end of the intermediate call. On the other hand, it is also possible that the SMS message will be communicated outside the usual traffic channels so that the timing marker can be processed in the mobile station even during the transmission of the call of such a third party and the corresponding data communication to the data processor system can be performed.

In accordance with another preferred embodiment of the method of the present invention, a time offset is compensated by a correcting factor, which offset inevitably derives, on the one hand, from the transit time between the GSM base station in the respective radio cell of the network operator and the subscriber station, and which, on the other hand, is due to signal delays caused by an optimum utilisation of the used communication channels. The application of such a correction factor is expedient particularly when there is a need for a highly precise time setting for the data processor system.

In correspondence with an exemplary embodiment of the present invention, a time offset value is used as correcting factor for compensating the time offset which depends on the distance and the communication mode. This correcting factor has a magnitude of preferably four seconds as practicable average value with due consideration of standardised protocols for the implementation of the service programme for application-related communication between a mobile subscriber and another user of a GSM radio network.

According to an improvement of the present invention, a correcting value is determined in the mobile system on the basis of several setting operation for the system-internal clock in correspondence with the method, which value is suitable for preventive correction of the internal time base. It is thus possible to save costs by extending the setting intervals for the system-internal clock.

In correspondence with yet another exemplary embodiment of the present invention, the transmission of an information in the format of an SMS message from the subscriber station of the data processor system, which is completed with the subscriber station's own address as destination address, is always caused only when an SMS message from an external station has not been received within a definable interval and a check or resetting of the system time is necessary.

In the broadest sense of the invention it is also possible to use any information emitted by an external action in the format of an SMS message for setting the system-internal clock.

In accordance with the present invention, the apparatus used for implementing the aforedescribed method of updating the system time of the timer in a data processor system includes a base station of a GSM radio network and a subscriber station authorised for radio communication in this network and associated with the same radio cell, which subscriber station is connected to the data processor system by means of a data communication line.

In the subscriber station a GSM module is provided for transmitting and receiving a SMS message in compliance with the telephone service programme of the GSM radio network.

According to another preferred embodiment of the invention, the data processor system includes a first electronic means for the transmission of an SMS message to itself at selectable time intervals. This feature ensures in a simple manner that a signal for updating the time base will be periodically available for setting the system time of the timer.

In correspondence with an exemplary embodiment of the present invention, a clock pulse generator and a memory unit are provided as first electronic means, which memory can be activated by the clock pulse generator and from which the specific identifier of the data processor system as well as a short information is retrieved as contents of an SMS message which the data processor system then sends to itself.

According to another exemplary embodiment of the present invention the data processor system includes a second electronic means for programming the GSM module, which allows for the use of the services of other radio telephone networks if the latter offer a message transmission combined with time and/or date information.

In correspondence with another exemplary embodiment of the present invention, an apparatus is provided for implementing the method, wherein the data processor system is configured as mobile device. For this purpose various potential applications are expedient. For instance a portable computer can be coupled to a radio telephone via a plug and play connector, or a portable computer equipped with a telecommunication means. In an equally advantageous manner, it is possible to use an SMS message for generating the time base for the system time of the timer of the data processor system of an automotive vehicle.

Other exemplary embodiments of the invention are characterised in the dependent claims or will be explained in more details in the following together with the description of the preferred embodiment of the invention with reference to the figures wherein:

DETAILED DESCRIPTION OF PREFERRED EMBODIMENT

In the method according to the present invention, the subscriber station 3, 3' of a data processor system 5 causes the transmission of an information in the format of a message 8, 10 which is supplemented by the subscriber station's own address as destination address. Then, upon receipt of a message, the time information of this message is selected and transferred into a memory of the data processor system 5, 30 including the actual system time.

Figure 1:
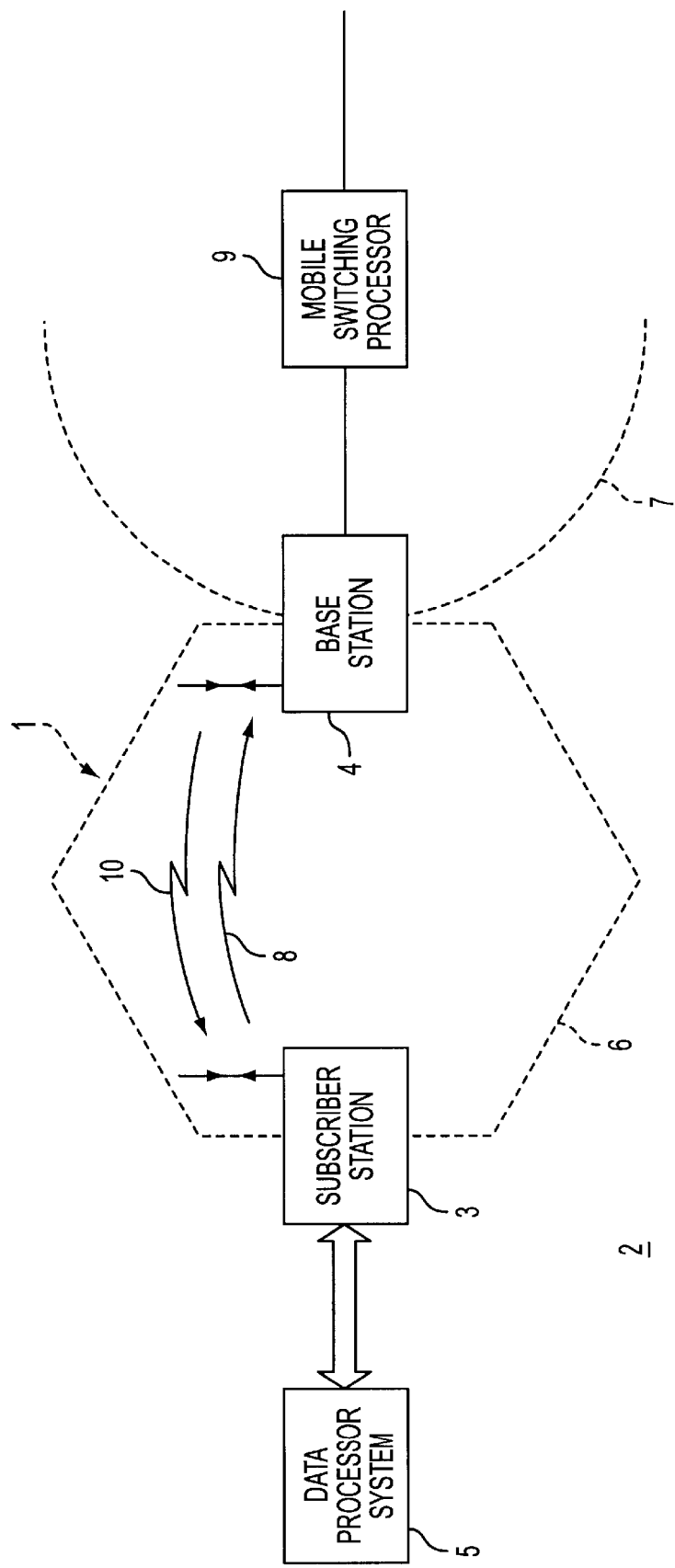
FIG. 1 illustrates an exemplary embodiment of a system for implementing the method of present invention.

FIG. 1 is an exemplary embodiment for implementing the method of updating the system time of the timer in a data processor system. FIG. 1 includes a subscriber station 3 authorised by the network operator to participate in the communication system in global system for mobile communication (GSM) network 2, a base station 4 of the GSM communication network, and a data processor system 5 adapted to be connected to the subscriber station. Processor system 5 can require the generation of a time base for the system time of its timer. Subscriber station 3 and base station 4 jointly use a communication cell 6 of the GSM network. It is well known in the art that communication cell 6 defines the geographic area given radio coverage by base station 4 of the present embodiment.

In the method according to the present invention, subscriber station 3 sends a message to itself, which is received by base station 4. SMS message 8 is provided with a timing marker—in co-operation with mobile switching processor 9—and returned via the base station 4 in the form of the signal 10 back to subscriber station 3.

The system-internal hardware in subscriber station 3 then selects the timing marker of the received SMS message 10 as digital signal component and uses it as time base for updating the system time of the timer in the data processor system 5 connected to the subscriber station.

Figure 2:
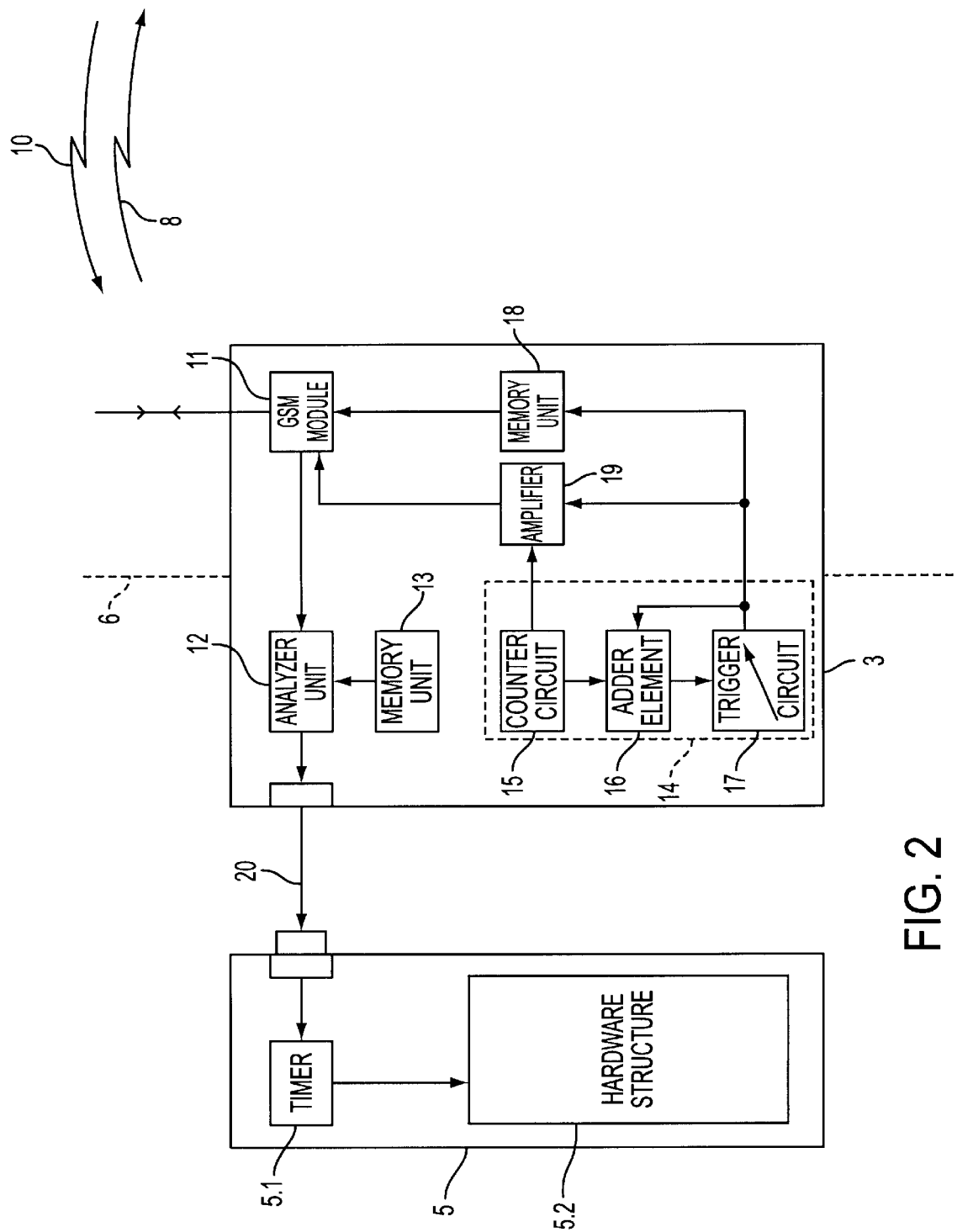
FIG. 2 is a block diagram of a first exemplary embodiment of a subscriber station for use in accordance with the present invention.

In reference to FIG. 2, subscriber station 3 comprises module 11 appropriate for using the telephone service program of the GSM communication network. Module allows for transmitting and receiving an SMS message via the GSM communication network.

Subscriber station 3 also includes analyzer unit 12 connected on the output side of the GSM module 11. The digital data contents of the timing marker are extracted from the SMS message for updating the time base for the system time of the timer 5.1 of a data processor system 5 which can be configured, for example, as a portable computer.

Prior to the actual transmission to the hardware structure 5.2 of the processor system 5 the time information of the timing marker is corrected by a time offset provided by memory unit 13 in correspondence with the instantaneous position of subscriber station 3 relative to base station 4. Correction in this manner makes it possible, if necessary, to update a highly precise time. The time offset, which is dependent on the location, can have a value of four seconds, for example.

With such a setting of the system time of the timer 5.1 of the portable computer 5 the differences in transit time between the send and receive signal 8 or 10, respectively, as well as a time offset caused by the communication mode for the implementation of the GSM service programme can be expediently compensated.

A clock pulse generator 14 is provided in subscriber station 3, which triggers the transmission of an SMS message from this system to itself at predetermined intervals so that the time setting of the system time of the timer 5.1 of the processor system 5, which is configured here as laptop computer, can be updated in the aforedescribed manner via the timing marker in the SMS message. The clock pulse generator 14 comprises a counter circuit 15 for producing output signals which are detected in an adder element 16 and which control a trigger circuit 17. In the trigger circuit a settable threshold switch is provided which has a threshold value that can be used to set the frequency of the automatic transmission of an SMS message optionally.

The output signal of the trigger circuit 17 contemporaneously activates both the GMS module 11 for the transmission of an SMS message and a memory unit 18 from which the subscriber station's own identifier and the contents of the SMS message to be transmitted are read. Simultaneously, the output signal of the trigger circuit resets the adder element 16. An amplifier module 19 is provided for matching the output signal of the trigger circuit 17 with the control input of the GSM module 11. Data communication line 20 between the subscriber station 3 and the portable computer 5 can be implemented, for example, in the form of an universal serial bus (USB) connection, or as an infrared or 1.4 MHz radio interface.

Figure 3:
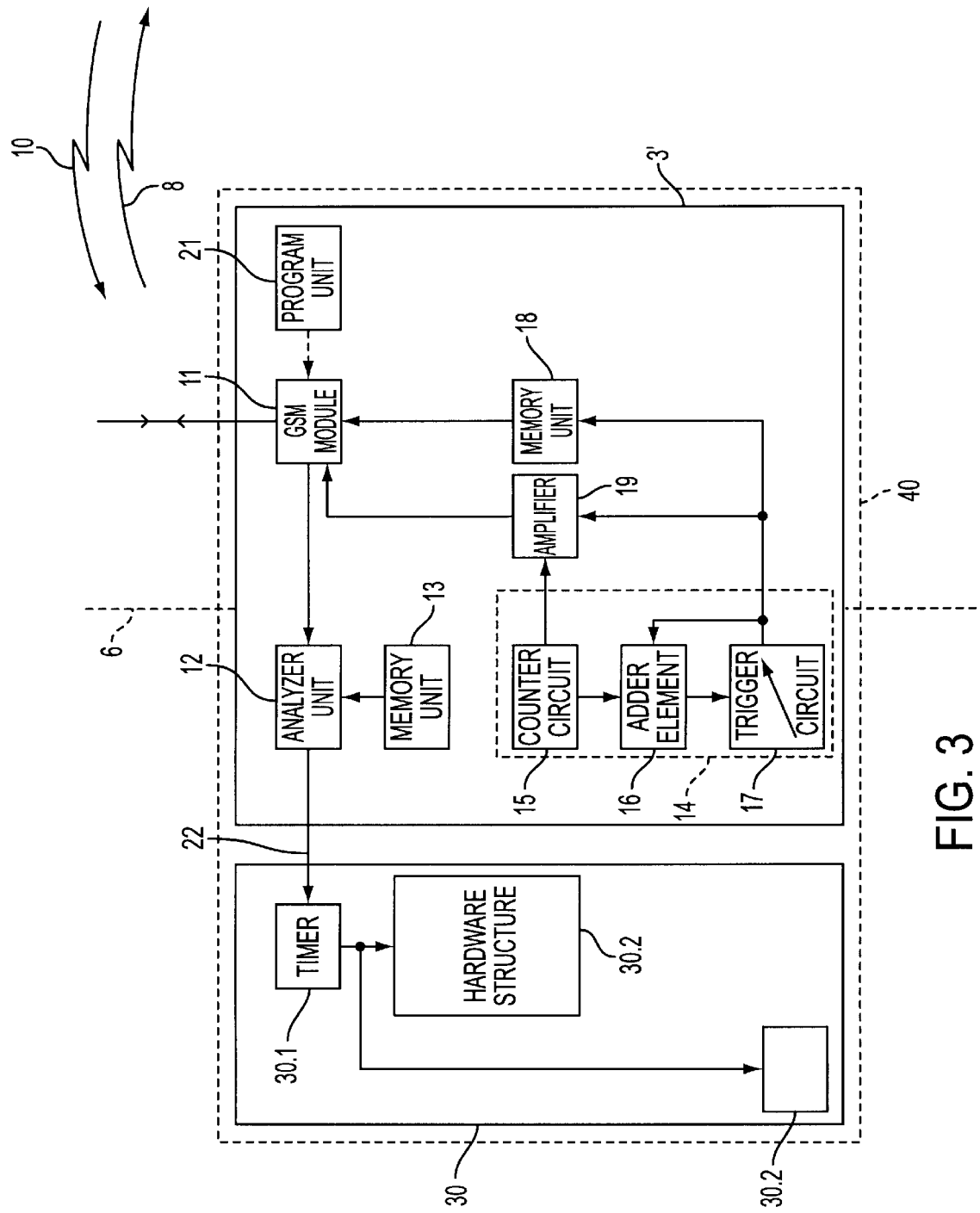
FIG. 3 is a block diagram of a second exemplary embodiment of a subscriber station for use in accordance with the present invention.

FIG. 3 illustrates an exemplary embodiment of an electronic telecommunication system 40 for implementing the present invention in a motor vehicle. Electronic telecommunication system 40 comprises a communication telephone 3', which is suitable for operation via a GSM communication network. Electronic telecommunication system 40 also includes a data processor system 30 in which an on-board computer and a satellite navigation system are combined to constitute a single structural unit. Compared against the subscriber station 3 illustrated in FIG. 2, the communication telephone 3' comprise a programming unit 21 which may be used to set the GSM module 11 for use of the services of a radio telephone network in another geographic territory.

When these networks provide for the transmission of message in combination with an SMS adequate time and/or date information the system time of the timer 30.1 of the data processor system 30 can be set at any time even in the case of a very wide cruising range of the motor vehicle. An internal data bus 22 is provided as data communication line between the communication telephone and the data processor system. The on-board computer and the satellite navigation system of the motor vehicle are identified by the reference numerals 30.2 or 30.3, respectively.

In terms of its implementation the present invention is not restricted to the aforedescribed preferred embodiments. Rather a number of variants is conceivable which make use of the solution presented here even with embodiments of a fundamentally different layout.

What is claimed is:

1. A method of updating a system time of a data processor system, the data processor system containing an actual system time and being linked to a subscriber station and a communication service of a wireless communication network operative to communicate a message together with time information comprising the steps of:

sending a message from the subscriber station, the message containing the subscriber station's own address as a destination address;

selecting the time information from the message upon receipt of the message at the subscriber station; and transferring the time information into a memory unit of the data processor system.

2. The method according to claim 1, wherein the communication service is the service of one of a global system for mobile communication (GSM) network and a universal mobile telecommunications system (UMTS) network.

3. The method according claim 1, wherein the message is in the Short Message Service (SMS) format.

4. The method according to claim 1, wherein the selecting and transferring of the message only occurs when the received message is congruent with a previously sent message.

5. The method according to claim 1, wherein said message is periodically emitted by the subscriber station.

6. The method according to claim 1, further comprising the step of:

adding a time correction amount to the selected time information, the time correction amount being operative to compensate the time offset which is caused by the transit time between the base station of the communication service and the subscriber station.

7. The method according to claim 6, wherein the time correction amount is a location-dependent time offset.

8. The method according to claim 1, further comprising the step of:

determining a correcting value in the data processor system on the basis of several setting operations for adaptation of the system-internal clock.

9. The method according to claim 1, further comprising the step of:

transmitting a Short Message Service (SMS) message containing the station's own address as a destination address from the subscriber station, when an externally triggered SMS message has not been received by the data processor system within a defined time interval.

10. A method of updating a system time of a data processor system said data processor system containing an actual system time and being linked to a subscriber station and a communication service of a wireless communication network operative to communicate a message together with time information comprising the steps of:

setting the system time of the data processor based on the time information communicated within a message sent by an action external to the subscriber station in the Short Message Service (SMS) format.

11. An apparatus for updating the system time of a data processor system comprising:

a data processor system for storing the actual system time, the data processor system including a memory;

a base station of a communication service;

a subscriber station authorized to participate in a communication network, wherein the subscriber station comprises a module for transmitting and receiving a message communicated within a communication service and is connected to said data processor system via a data communication line;

a means for transmitting a message from the subscriber station of the data processor system, wherein the message contains the subscriber station's own address as a destination address; and a means for selecting the time information from the message upon receipt of the message, and for transferring the time information into the memory of the data processor system.

12. The apparatus according to claim 11, wherein the subscriber station comprises a timer means peratively arranged for initiating a periodic transmission of said message.

13. The apparatus according to claim 12, wherein the timer means comprises a clock pulse generator and a memory unit, the memory unit being activated by the clock pulse generator, and the timer means being operative to read from the memory unit the subscriber station's own identifier and contents of a message.

14. The apparatus according to claim 13, wherein the clock pulse generator is the system clock pulse generator.

15. The apparatus according to claim 11, wherein the data processor system comprises a mobile unit.

16. The apparatus according to claim 15, wherein the data processor system comprises a portable computer adapted to be connected to the subscriber station.

17. The apparatus according to claim 16, wherein the portable computer is connected to the subscriber station via a parallel interface.

18. The apparatus according to claim 16, wherein the portable computer is connected to the subscriber station via a serial interface.

19. The apparatus according to claim 15, wherein the data processor system comprises a portable computer forming a single structural module together with the subscriber station.

* * * * *